(12) United States Patent
Franksson

(10) Patent No.: US 6,772,653 B1
(45) Date of Patent: Aug. 10, 2004

(54) LINEAR ACTUATOR

(76) Inventor: Gretar Franksson, Lyngberg 31,
IS-220 Hafnarfiroi (IS)

( * ) Notice: Subject to any disclaimer, the term of this patent is extended or adjusted under 35 U.S.C. 154(b) by 0 days.

(21) Appl. No.: 10/089,764

(22) PCT Filed: Sep. 22, 2000

(86) PCT No.: PCT/IB00/01341

§ 371 (c)(1),
(2), (4) Date: Jun. 27, 2002

(87) PCT Pub. No.: WO01/25654

PCT Pub. Date: Apr. 12, 2001

(30) Foreign Application Priority Data

Oct. 1, 1999 (GB) .............................................. 9923116

(51) Int. Cl.[7] ............................................ F16H 27/02
(52) U.S. Cl. ...................... 74/89.36; 74/89.35
(58) Field of Search .............................. 74/89.35, 89.36

(56) References Cited

U.S. PATENT DOCUMENTS

| | | | |
|---|---|---|---|
| 2,874,556 A | 2/1959 | Kraus | |
| 4,307,799 A | 12/1981 | Zouzoulas | |
| 4,934,203 A | 6/1990 | Bailey et al. | |
| 5,140,863 A | * | 8/1992 | Niino et al. ............... 74/89.36 |
| 5,511,439 A | 4/1996 | Las Navas Garcia | |
| 6,073,505 A | 6/2000 | Yuda | |
| 6,101,889 A | 8/2000 | Laskey | |
| 2001/0039846 A1 | * | 11/2001 | Nagai et al. ............... 74/89.36 |

FOREIGN PATENT DOCUMENTS

| | | |
|---|---|---|
| DE | 195 19 948 | 12/1996 |
| EP | 0 386 771 | 9/1990 |
| EP | 0 799 672 | 10/1997 |

* cited by examiner

Primary Examiner—David Fenstermacher
(74) Attorney, Agent, or Firm—Ware, Fressola, Van Der Sluys & Adolphson LLP

(57) ABSTRACT

The linear actuator has a motor housing (1) of tubular stainless steel with an end cap (2), a motor (4) and epicyclic gearbox (6). The actuator has a telescopic arm (11), having an outer tube (12) and an inner tube (13) of stainless steel. The outer tube is removably attached to the motor housing. An extension screw (16) is provided in the arm with a driven end (16) journalled at the motor housing end (17) of the outer tube. At its inner end, the inner tube has threaded into it a plastics material nut (18), in which the screw engages. The end of the screw (16) has a clevis (23), open (24) axially away from the screw. The output shaft (7) from the gear box has a cross pin (31) through it. On each side of the shaft, the pin carries a respective roller (32), sized to fit in the clevis (23). The clevis and rollers form a dog clutch for transfer of drive from the gearbox to the extension screw. The telescopic arm is readily dismounted from the motor housing by unscrewing the disc (21) and axially withdrawing the clevis from the rollers.

12 Claims, 3 Drawing Sheets

LINEAR ACTUATOR

CROSS-REFERENCE TO RELATED APPLICATIONS

Priority is claimed from International Application PCT/IB00//01341 filed 22 Sep. 2000, which in turn claims priority from UK application 9923116.9 filed Oct. 1, 1999.

TECHNICAL FIELD

The present invention relates to a linear actuator.

BACKGROUND OF THE INVENTION

Linear actuators, for instance hydraulic rams, have many applications, in lifting, extending linkages and equipment etc. Electric linear actuators are known for applications where a source of pressure fluid is not available.

Such linear actuator is described in U.S. Pat. No. 4,934,203 comprises: a motor housing having one end fitting, a motor housed in the motor housing, a reduction gearbox housed in the housing, the motor being connected to a input of the gearbox, and a telescopic arm, having an outer tube attachable to the motor housing, an inner tube having another end fitting, an extension screw having a driven end journalled at the motor housing end of the outer tube and engaging a nut in the corresponding end of the inner tube, rotation of the screw causing the inner tube to extend or retract with respect to the outer tube, In hostile environments, such as onboard fishing vessels, electric actuators have a shorter life than in less onerous environments. Failure of actuators can have a serious effect on the operation of a fishing vessel, so that a supply of spare actuators is desirable. Since a variety of different sizes of actuators are required, for different hoists etc., the supply of spare actuators must include the different sizes, despite space being at a premium.

SUMMARY OF THE INVENTION

The object of the present invention is to provide an improved actuator whose the main components are separately replaceable, whereby spares inventory limitations are eased.

According to the invention there is provided a linear actuator comprising:

- a motor housing having one end fitting, a motor housed in the motor housing, a reduction gearbox housed in the housing, the motor being connected to an input of the gearbox,
- a telescope arm, having an outer tube attachable to the motor housing, an inner tube having another end fitting, an extension screw contained within the telescopic arm and the motor housing and having a driven end journalled at the motor housing end of the outer tube and engaging a nut fast at the proximal end of the inner tube, rotation of the screw causing the inner tube to extend or retract with respect to the outer tube, characterised in that the linear actuator further comprises:

- an engageable connection of an output of the reduction gearbox and the driven end of the extension screw for transmitting drive from the gearbox to the extension screw for extension and retraction of the inner tube,
- a detachable connection of the outer tube to the motor housing, the arrangement being such that attachment of the outer tube to the motor housing and engagement of the extension screw with the gearbox prepares the linear actuator for use.

In event of failure in use, either the motor in the housing or the telescopic arm are likely to have failed without failure of the other. Thus the actuator can be simply repaired by replacement of the relevant portion.

Further, where a variety of different lengths of telescopic arms, possibly with a variety of differently pitched screws, are used on a single ship for instance, spare arms can be carried and fitted to commonly sized motor housings. A smaller supply of these can be carried in accordance with the service life in the environment.

Preferably, the engageable connection is an axially engageable dog clutch. This can comprise a clevis and a spigot with a transverse pin engageable in the clevis, the clevis being connected to one of the extension screw and the gearbox output and the spigot and pin being connected to the other. To allow for possible slight misalignment, the transverse pin can have a pair of rollers arranged on it, the rollers being on respective opposite sides of spigot.

In the preferred embodiment, the detachable connection of the telescopic arm and the motor housing is a screw connection. The latter preferably incorporates an O-ring seal for sealing the telescopic arm to the motor housing.

For control of stroke, position, velocity—by electronic circuitry—the output of the gearbox is preferably provided with a rotation counter. Provision of the counter at the gearbox output enables the count to be of a smaller number of revolutions, by the gearbox ratio, than if the counter were arranged to count the revolutions of the motor.

Preferably, the linear actuator includes a seal between the inner tube and the outer tube, the seal leaving the tubes being free to rotate relatively about a common axis, the end fittings being adapted to restrain relative rotation for extension and retraction of the telescopic arm.

Preferably, the nut at the end of the inner tube and having the extension screw engaged therein is of generally weaker material than the other components, whereby it forms a weak link in the event of overloading of the actuator.

BRIEF DESCRIPTION OF THE DRAWINGS

To help understanding of the invention, a specific embodiment thereof will now be described by way of example and with reference to the accompanying drawings, in which.

BEST MODE FOR CARRYING OUT THE INVENTION

Figure 1:
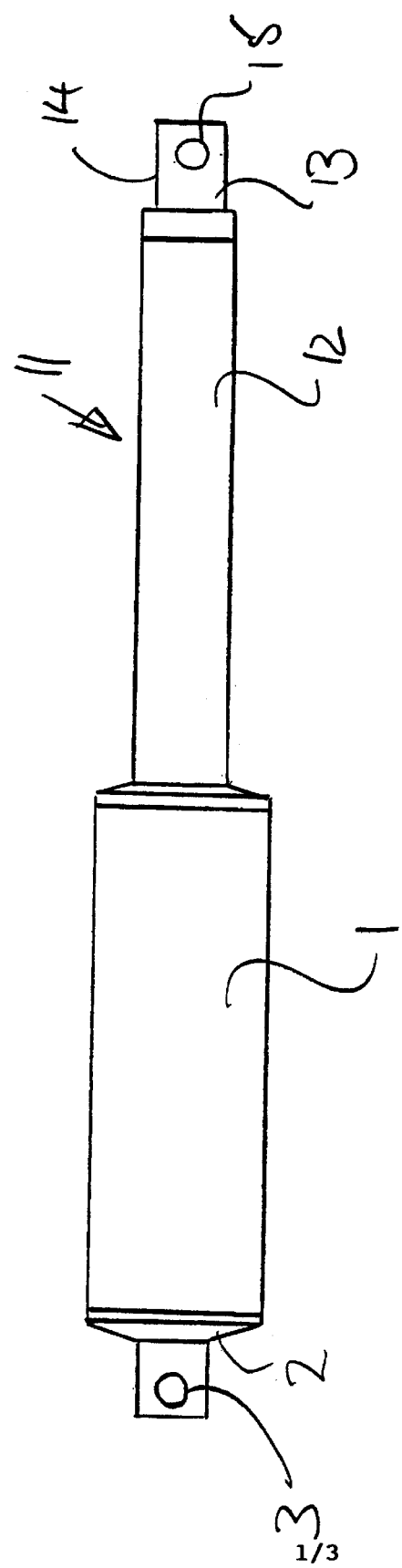
FIG. 1 is a side view of a linear actuator according to the invention.
Figure 2:
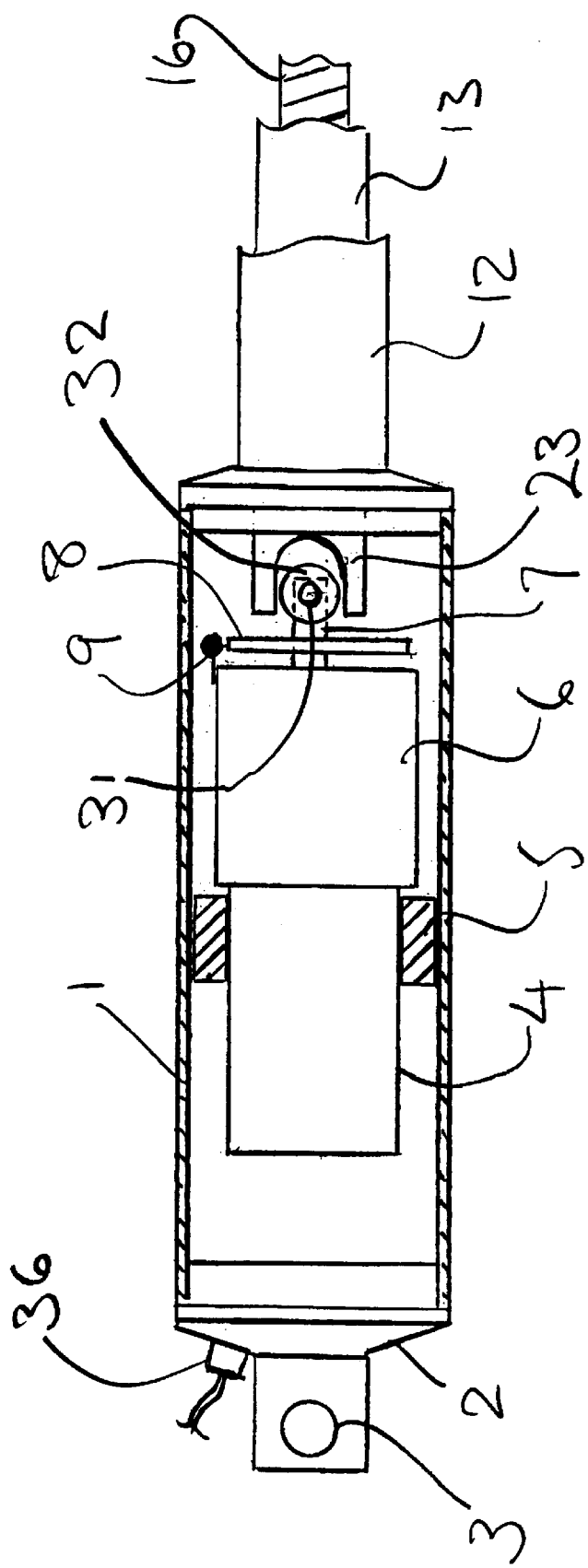
FIG. 2 is a cross-sectional side view of a motor housing of the actuator.
Figure 3:
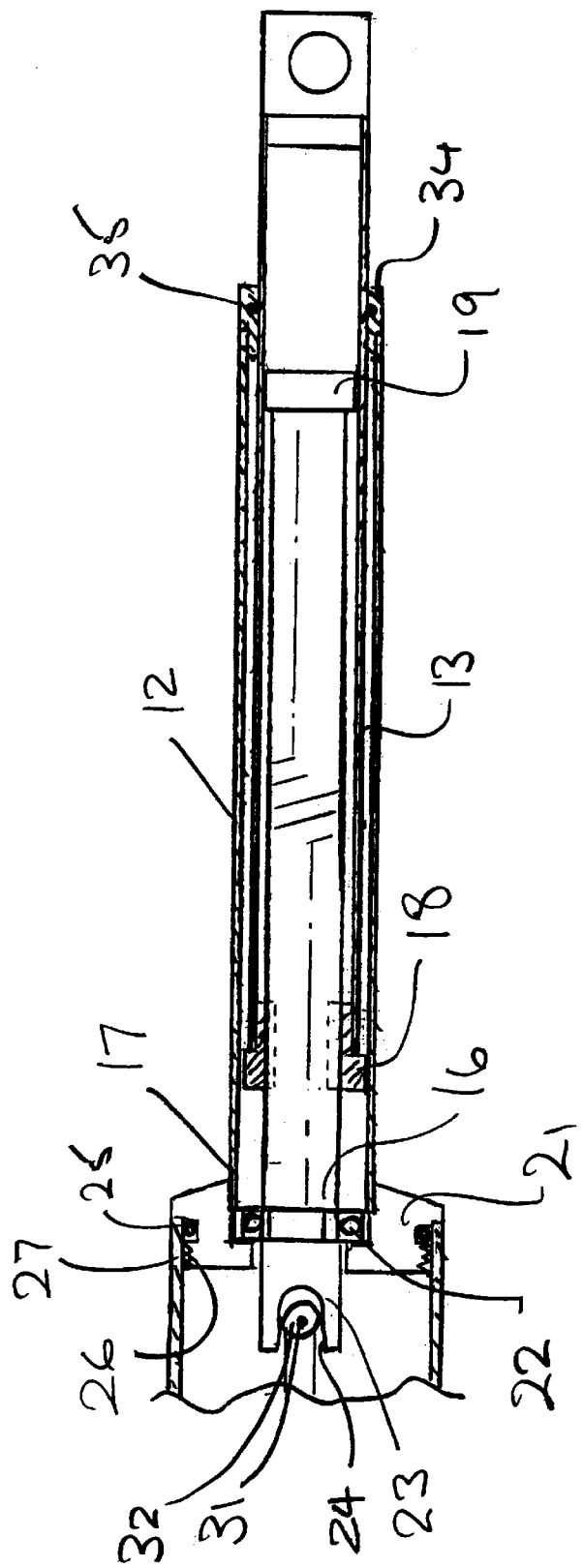
FIG. 3 is a similar view of a telescopic arm of the actuator.

Referring to the drawings, the linear actuator has a motor housing 1 of tubular stainless steel in common with other major components of the device. It has an end cap 2 with one end-fitting eye 3 by means of which the actuator can be pinned to equipment to be actuated. An electric motor 4 is mounted in the motor housing 1 via a resilient mounting 5. A reduction, epicyclic gearbox 6 is also provided in the housing attached to the motor, whose output is connected to a input of the gearbox. The output shaft 7 of the gearbox has a signalling disc 8, whose rotation can be detected by a transducer 9 fixed to the end of the gearbox.

The actuator has a telescopic arm 11, having an outer tube 12 and an inner tube 13 of stainless steel. The outer tube is removably attached to the motor housing as described in more detail below. The distal end of the inner tube has an end fitting 14, which plugs it and has another end-fitting eye 15 for pinning of the other end of the actuator to the equipment to be actuated. An extension screw 16 is provided in the arm with a driven end 16 journalled at the motor housing end 17 of the outer tube. At its inner end, the inner tube has threaded into it a plastics material nut 18, in which the screw engages. The distal end of the screw carries a guide 19 for centring it in the inner tube. The guide is secured to provide a stop 20 against unwinding of the screw from the nut and over-extension of the actuator.

The motor housing end of the outer tube is threadedly engaged in a disc 21, with the outer race of a bearing 22 for the screw captivated between the tube and a seat in the disc. This threading—and that of the cap 2 into the motor housing and the end fitting 14 into the inner tube 13—is rendered watertight by sealant applied to the threads. The inner race of the bearing 22 is captivated at the end of the screw 16 by a clevis 23 fixed to the screw. The clevis is open 24 axially away from the screw.

The disc 21 has a sealing O-ring 25 in a groove within a thread 26, which is complementary to a thread 27 in the end of the motor housing tube 1. A plain bore outside the thread 27 provides a seat for the O-ring. This watertight connection enables the telescopic arm to be readily detached from the motor housing.

The output shaft 7 from the gearbox has a cross pin 31 through it. On each side of the shaft, the pin carries a respective roller 32, sized to fit in the clevis 23. The clevis and rollers form a dog clutch for transfer of drive from the gearbox to the extension screw. Its configuration is such that it can accommodate slight misalignment of the gearbox output shaft and the screw, as can occur through build up of tolerances resulting from the different telescopic arms being interchangeably attachable to the motor housing.

The telescopic arm is readily dismounted from the motor housing by unscrewing the disc 21 and axially withdrawing the clevis from the rollers.

In use, the actuator is pinned by its end fittings to respective movable parts of the equipment to be actuated. For their movement, the motor is driven in the appropriate direction, for the appropriate number of revolutions as measured by the transducer 9. Wiring for output from the transducer and supplying power to the motor enters through a sealed fitting 36.

If fast operation is required in a particular application, a telescopic arm with a larger pitch of screw thread can be swapped for one with a smaller pitch. Equally if a longer or shorter stroke is required, the telescopic arm can be chosen appropriately for the same motor and its housing.

It should be noted that provision of the nut 18 in plastics material provides a design failure point in case of shock over-loading of the actuator. Thus the motor and housing are protected and the telescopic arm can be replaced readily and quickly. The damaged telescopic arm can be straightforwardly repaired. Provision of the nut 18 in plastics material has the further advantage that its outer diameter 181 is able to be slightly larger than the diameter of inner tube and a low friction sliding fit in the outer tube.

For water proofing of the actuator, not only are the screwed connections sealed as described above, the distal end of the outer tube is provided with a guide 34 for the inner tube and the guide is provided with a seal 35.

The guide also is of plastics material to provide low friction with the inner tube. The guide and the nut provide alignment of the two parts of the telescopic arm. Should the application cause the end-fitting eyes 3,15 to rotate relatively about the central axis of actuator, the guide 34 can accommodate this and the tubes rotate to suit.

The invention is not intended to be restricted to the details of the above described embodiment. For instance, the telescopic arm can be attached to the motor housing by means other than a screw thread, for instance a bayonet fitting. The rollers can be of more or less resilient material, if more resilient, they absorb shock and are quieter.

What is claimed is:

1. A linear actuator comprising:
    a motor housing having one end fitting, a motor housed in the motor housing,
    a reduction gearbox housed in the h sing, the motor being connected to an input of the gearbox,
    a telescope arm, having an outer tube attachable to the motor housing, an inner tube having another end fitting, an extension screw contained within the telescopic arm and the motor housing and having a driven end journalled at the motor housing end of the outer tube and engaging a nut fast at the proximal end of the inner tube, rotation of the screw causing the inner tube to extend or retract with respect to the outer tube,
    characterised in that the linear actuator further comprises:
    an engageable connection of an output of the reduction gearbox and the driven end of the extension screw for transmitting drive from the gearbox to the extension screw for extension and retraction of the inner tube.

2. A linear actuator as claimed in claim 1, wherein the engageable connection is an axially engageable dog clutch.

3. A linear actuator as claimed in claim 2, wherein dog clutch comprises a clevis and a spigot with a transverse pin engageable in the clevis, the clevis being connected to one of the extension screw and the gearbox output and the spigot and pin being connected to the other.

4. A linear actuator as claimed in claim 3, wherein the transverse pin has a pair of rollers arranged on it, the rollers being on respective opposite sides of spigot.

5. A linear actuator as claimed in claim 1, wherein the detachable connection of the telescopic arm and the motor housing is a screw connection.

6. A linear actuator as claimed in claim 5, wherein the motor housing is tubular and the outer rube has a disc attached at its motor housing end, the screw connection comprising complementary threads cut in the disc and the motor housing.

7. A linear actuator as claimed in claim 6, including a bearing for journalling the extension screw in the telescopic arm the outer tube being threadedly attached to the disc and the bearing being captivated by the threaded attachment, the latter preferably being sealed by thread sealant.

8. A linear actuator as claimed in claim 5, wherein the screw connection incorporates an O-ring seal for sealing the telescopic arm to the motor housing.

9. A linear actuator as claimed in claim 1, wherein the motor is resiliently mounted in the motor housing.

10. A linear actuator as claimed in claim 1, wherein the output of the gearbox is provided with a rotation counter.

11. A linear actuator as claimed in claim 1, including a seal between the inner tube and the outer tube, the seal leaving the tubes being free to rotate relatively about a common axis, the end fittings being adapted to restrain relative rotation for extension and retraction of the telescopic arm.

12. A linear actuator as claimed in claim 1, wherein the nut at the end of the inner tube and having the extension screw engaged therein is of generally weaker material than the other components, whereby it forms a weak link in the event of overloading the actuator.

* * * * *

UNITED STATES PATENT AND TRADEMARK OFFICE
CERTIFICATE OF CORRECTION

PATENT NO. : 6,772,653 B1
DATED : August 10, 2004
INVENTOR(S) : Gretar Franksson It is certified that error appears in the above-identified patent and that said Letters Patent is hereby corrected as shown below:

Column 1,
Line 28, after "tube" please delete "," and replace with -- . --.

Column 4,
Line 11, please delete "h sing" and replace with -- housing --.
Line 39, please delete "rube" and replace with -- tube --.
Line 45, after "arm" please insert -- , --.

Signed and Sealed this

Nineteenth Day of October, 2004

JON W. DUDAS
*Director of the United States Patent and Trademark Office*